United States Patent
Thiyagarajan et al.

(10) Patent No.: US 10,996,064 B2
(45) Date of Patent: May 4, 2021

(54) DYNAMIC MULTI-MODAL MOBILITY SERVICE PLATFORM

(71) Applicant: Ridecell, Inc., San Francisco, CA (US)

(72) Inventors: Pirasenna Thiyagarajan, Palo Alto, CA (US); Aarjav Trivedi, Berkeley, CA (US); ArunKumar Elangovan, Walnut Creek, CA (US)

(73) Assignee: Ridecell, Inc., San Francisco, CA (US)

( * ) Notice: Subject to any disclaimer, the term of this patent is extended or adjusted under 35 U.S.C. 154(b) by 276 days.

(21) Appl. No.: 16/135,759

(22) Filed: Sep. 19, 2018

(65) Prior Publication Data
US 2019/0086221 A1 Mar. 21, 2019

Related U.S. Application Data

(60) Provisional application No. 62/560,957, filed on Sep. 20, 2017.

(51) Int. Cl.
*G01C 21/34* (2006.01)
*G01C 21/36* (2006.01)
*G06Q 30/06* (2012.01)
*G08G 1/16* (2006.01)

(52) U.S. Cl.
CPC ..... *G01C 21/3423* (2013.01); *G01C 21/3438* (2013.01); *G06Q 30/0633* (2013.01); *G01C 21/3605* (2013.01)

(58) Field of Classification Search
CPC .... G01C 21/00; G01C 21/34; G01C 21/3423; G01C 21/3476; G01C 21/3484; G01C 21/3492; G01C 21/3605; G01C 21/3614; G01C 21/3617; G08G 1/00; G08G 1/16; G06Q 30/00; G06Q 30/06
See application file for complete search history.

(56) References Cited

U.S. PATENT DOCUMENTS

| | | | | |
|---|---|---|---|---|
| 10,180,331 | B2 * | 1/2019 | Hajj | G06F 3/0488 |
| 10,197,409 | B2 * | 2/2019 | Pirwani | G08G 1/123 |
| 10,302,442 | B2 * | 5/2019 | Hajj | G08G 1/012 |
| 10,371,537 | B1 * | 8/2019 | Wilczynski | G01C 21/3453 |
| 10,401,180 | B2 * | 9/2019 | Pirwani | G01C 21/3667 |
| 10,458,801 | B2 * | 10/2019 | Lord | G01C 21/3438 |
| 10,533,865 | B2 * | 1/2020 | Hajj | G06F 3/0488 |
| 2012/0035839 | A1 * | 2/2012 | Stehle | G06Q 10/04 701/117 |

(Continued)

OTHER PUBLICATIONS

PCT Application No. PCT/US18/51960, International Search Report and Written Opinion dated Jan. 29, 2019.

*Primary Examiner* — Yonel Beaulieu
(74) *Attorney, Agent, or Firm* — Larry E. Henneman, Jr.; Henneman & Associates, PLC

(57) ABSTRACT

A method for providing a route in response to a request includes receiving a request for a route, comprising a start location and an end location. The method further includes determining a source based at least in part on the request and obtaining route segments from the source. Additionally, the method includes generating a suggested route, comprising a plurality of the route segments, and transmitting the suggested route in response to the request. The suggested route is generated based at least in part on the start location, the end location, and the route segments. Systems for carrying out the method are also disclosed.

21 Claims, 6 Drawing Sheets

(56) References Cited

U.S. PATENT DOCUMENTS

| | | | |
|---|---|---|---|
| 2013/0304367 A1* | 11/2013 | Stehle | G06Q 30/0215 |
| | | | 701/117 |
| 2014/0278071 A1* | 9/2014 | San Filippo | G01C 21/3423 |
| | | | 701/465 |
| 2014/0278086 A1* | 9/2014 | San Filippo | G01C 21/3492 |
| | | | 701/527 |
| 2016/0187148 A1* | 6/2016 | Unger | G01C 21/3461 |
| | | | 701/400 |
| 2016/0202079 A1 | 7/2016 | Konig et al. | |
| 2016/0203422 A1 | 7/2016 | Demarchi et al. | |

\* cited by examiner

DYNAMIC MULTI-MODAL MOBILITY SERVICE PLATFORM

RELATED APPLICATIONS

This application claims priority to U.S. Provisional Application No. 62/560,957, filed Sep. 20, 2017 by the same inventors, which is incorporated herein by reference in its entirety.

BACKGROUND

Field of the Invention

The invention relates generally to route planning and, more particularly, to route planning tools.

Description of the Background Art

Trip planning or route planning is directed at finding optimal paths between two or more identified locations. Most route planning tools identify one or more paths between the identified locations using a specific mode of transport. In some embodiments, the routes, schedules and constraints may be based on information obtained from a transportation service provider.

SUMMARY

An example method of the present invention includes receiving a request for a route, determining a source based at least in part on the request, obtaining route segments from the source, generating a suggested route, and transmitting the suggested route in response to the request. The request includes a start location and an end location and the suggested route is generated based at least in part on the start location, the end location, and the route segments. The suggested route also includes a plurality of the route segments. Each of the route segments can have different modes of transportation available thereto, such as a private vehicles, mass transit, and personal options.

A particular method includes determining a user account identifier and obtaining user preferences associated with the user account identifier. The user account identifier can be determined based at least in part on the request and the suggested route is based at least in part on the user preferences. In a more particular method, the user preferences identify a particular accommodation (e.g., handicap accessibility, luggage storage, etc.) required on at least a portion of the route segments. In another more particular method, the user preferences identify a particular route parameter (e.g., price, travel time, preferred transportation type, etc.) to be optimized in the suggested route.

Another particular method includes receiving user preferences with the request and generating the suggested route based at least in part on the user preferences. In a more particular method, the user preferences identify a particular accommodation required on at least a portion of the route segments. In another more particular method, the user preferences identify a particular route parameter to be optimized in the suggested route.

Yet another particular method includes determining a list comprising data associated with the plurality of the route segments and transmitting the list in response to the request. Another particular method includes receiving a second request and initiating a purchase transaction in response to the second request. The second request is a purchase request associated with one of the route segments and the purchase transaction (e.g. purchasing a train ticket) grants access to a mode of transportation associated with the route segment.

An example system of the present invention includes one or more computer processors and one or more memories comprising computer-executable instructions. The computer-executable instructions are operable to cause the system to receive a request for a route, determine a source based at least in part on the request, obtain route segments from the source, generate a suggested route, and transmit the suggested route in response to the request. The request includes a start location and an end location and the suggested route is generated based at least in part on the start location, the end location, and the route segments. The suggested route also includes a plurality of the route segments. Each of the route segments can have different modes of transportation available thereto, such as a private vehicles, mass transit, and personal options.

In a particular example system the computer-executable instructions are further operable to cause the system to determine a user account identifier and obtain user preferences associated with the user account identifier. The user account identifier can be determined based at least in part on the request and the suggested route is based at least in part on the user preferences. In a more particular example system, the user preferences identify a particular accommodation (e.g., handicap accessibility, luggage storage, etc.) required on at least a portion of the route segments. In another more particular example system, the user preferences identify a particular route parameter (e.g., price, travel time, preferred transportation type, etc.) to be optimized in the suggested route.

In another particular example system the request for a route includes user preferences and the computer-executable instructions are operable to cause the system to generate the suggested route based at least in part on the user preferences. In a more particular method, the user preferences identify a particular accommodation required on at least a portion of the route segments. In another more particular method, the user preferences identify a particular route parameter to be optimized in the suggested route.

In yet another particular example system, the computer-executable instructions are additionally operative to determine a list comprising data associated with the plurality of the route segments and transmit the list in response to the request. Another particular example system includes receiving a second request and initiating a purchase transaction in response to the second request. The second request is a purchase request associated with one of the route segments and the purchase transaction (e.g. purchasing a train ticket) grants access to a mode of transportation associated with the route segment.

An example non-transitory computer-readable medium includes instructions therein for causing a device to receive a request for a route, determine a source based at least in part on the request, obtain route segments from the source, generate a suggested route, and transmit the suggested route in response to the request. The request includes a start location and an end location and the suggested route is generated based at least in part on the start location, the end location, and the route segments. The suggested route also includes a plurality of the route segments. Each of the route segments can have different modes of transportation available thereto, such as a private vehicles, mass transit, and personal options.

Figure 1:
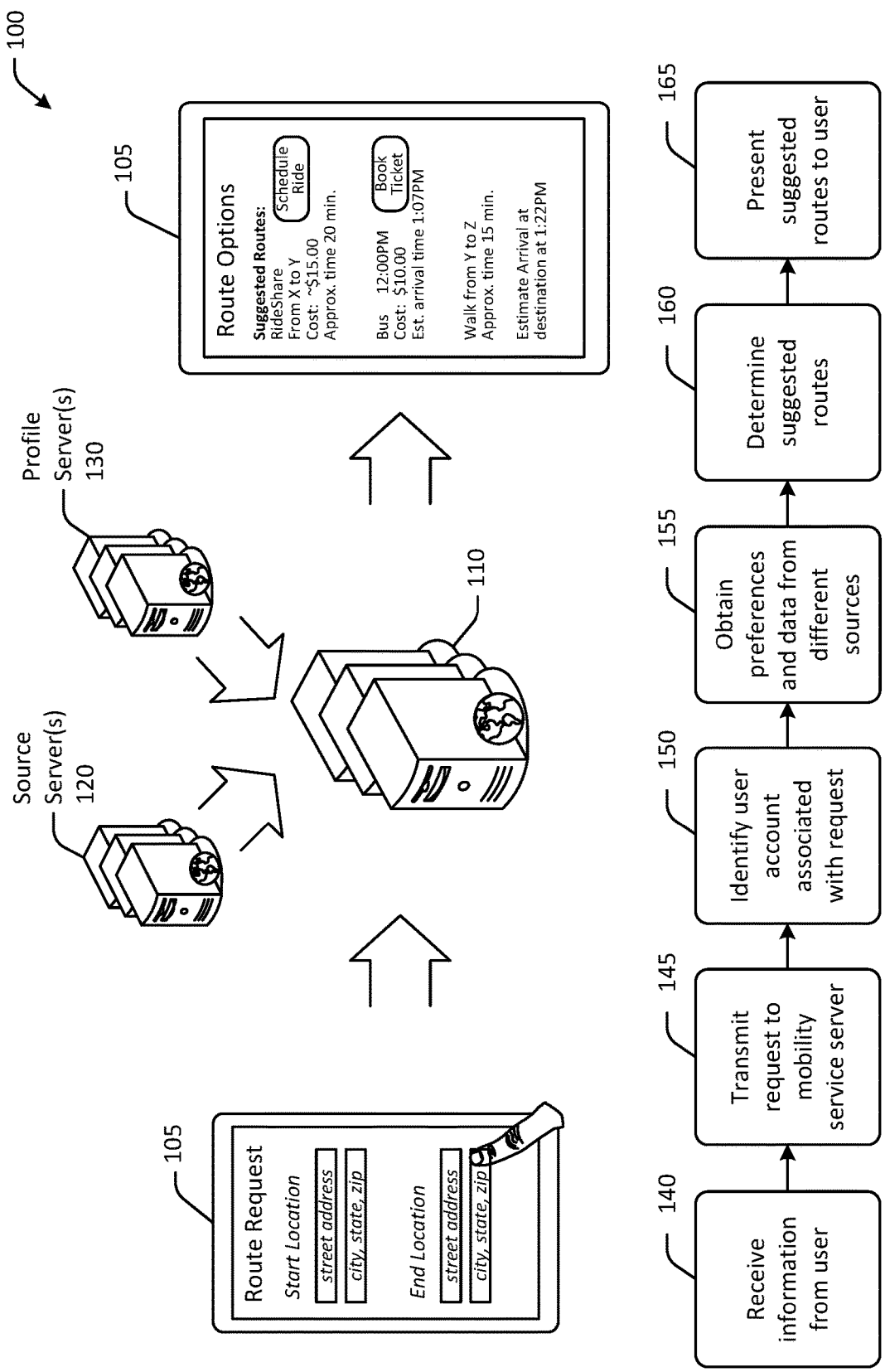
FIG. 1 is a hybrid system and process diagram for a dynamic multi-modal mobility service platform in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques and methodologies for a dynamic multi-modal mobility services platform. The systems and methods described herein are directed to integrating multiple types of commuting services into one platform ecosystem accessible by user devices. In some embodiments, a commuting edge may be split into fragments of intermediate transfer points. Each transfer point may represent a switch in or change between modes of transportation. The systems and methods described herein may calculate optimal paths from a start location to destination location, and provide commute options and logical transfer points in the way.

In some embodiments, the path may be optimized for an identified parameter, such as cost, time, mode of transportation, or other factors. The path calculation may take into consideration specific requirements for the trip, such as accessibility needs (e.g., wheel-chair) or lifestyle needs (e.g., bike transport).

The systems and methods described herein may provide multi-modal transport options, where the route may be segmented into path segments and different modes of transportation may be available for the different path segments. The different modes of transportation may include, but are not limited to a private fleet of vehicles (e.g., autonomous, rideshare, limo service, taxi service, etc.), public transit options (e.g., buses, trains, ferries, etc.), individual options (e.g., biking, walking, etc.), and the like.

In some embodiments, a user may specify different parameters, which may be used in the calculation of the optimized path generation. For example, a user may specify a need for wheelchair support, accommodations for a bicycle (e.g., bike rack), accommodations for young children (e.g., car seats, etc.), and the like.

In some embodiments, the systems and methods described herein may provide the user with a user interface that presents an integrated listing of public and private fleet schedules as well as associated costs. In some embodiments, the user may be able to initiate scheduling or purchase of tickets for the different modes of transportation of the identified route. Autonomous vehicle services and/or real-time autonomous vehicle availability may be integrated in the system and incorporated in the generation of optimized routes or paths. In some embodiments, the paths may include short-distance walking directions in the generation of optimized paths or routes.

In some embodiments, the users may select a suggested route or may choose to build their own routes based on the presented options. In some embodiments, routes or paths may be suggested based on cost, time of travel, comfort, or the like. In some embodiments, the routes or paths suggested may be generated based at least in part on constraints specified by the user and may be ordered based on user preferences, an identified start time, or an identified arrival time of a trip. Examples of constraints may include "no toll roads" or "no ferries."

In some embodiments, step-by-step guidance may be provided for the user and may be stored locally on the user device for reference as the user travels to his or her destination. The user may be provided status updates for events that may affect his or her trip. Such notifications may be received in real-time or near real-time. In some embodiments, alternate path segments may be presented in response to events that may affect the arrival time at the identified destination location, such as traffic, accidents, maintenance, or the like.

In an example use case, a user may provide a start location, end location, one or more restrictions and/or preferences for a route through a client application on his or her user device. The user device may transmit a request to a mobility service server. The mobility service server may receive the request and may calculate a center point between the start and end locations. The mobility service server may identify a distance radius inclusive of the start and end locations and may obtain data associated with the different transportation modes available within the radius from different sources (e.g., train schedules from a passenger railway service provider, rideshare availability from a rideshare provider, etc.). In some embodiments, the mobility service server may calculate the path between the start location and the end location in a conventional system or as a linear geometric path and may determine the services offered based on a linear regression of services along the path.

In some embodiments, the mobility service server may utilize machine learning techniques to identify options for different modes of transportation for the given start area and end area based on training data input into the model learning model. For example, the system may query services identified as potential transport providers. Agents for each of the potential transport providers may provide a respective segment of transport based on the start and end location, its cost, start times, duration of the segment, or the like. In some embodiments, options for segment calculation may use adaptable machine learning algorithms including logistic regression, clustering algorithm, principal component analysis, and the like.

In some embodiments, the mobility service server may obtain and aggregate the different route segment options. In some embodiments, the mobility service server may use a distance matrix to verify and confirm that the constraints provided by the user or associated with the user have been satisfied. The different route segment options may be transmitted to the requesting user device for presentation to the user.

Referring to FIG. 1, an example use case 100 illustrating a dynamic multi-modal mobility service platform is depicted in accordance with one or more embodiments of the disclosure. A user may interact with a user device 105 to initiate a request for a route for a trip. The user may provide information for the trip, such as a start location, an end location, date and time of the trip, preferences, and/or transportation mode constraints. The user device 105 may transmit the request for the route to a mobility service server 110. The mobility service server 110 may receive the request and obtain data from the request. The mobility service server 110 may communicate with one or more source servers 120 to obtain route segment information (e.g., available transportation modes, cost for the mode of transportation, departure time, etc.). The mobility service server 110 may communicate with one or more profile servers 130 to obtain user preferences and/or user travel history data. The mobile service server 110 may generate a suggested route based on the information obtained from the request, source servers 120, and/or profile servers 130. In some embodiments, the mobile service server 110 may generate an aggregated list of transportation options (including cost, departure times, and/or link to schedule the mode of transportation). The suggested route and list of options may be transmitted to the user device 105 for presentation to the user. In some embodiments, the user device may transmit a request for further action (e.g., selecting a link associated with a route segment to purchase a ticket for that route segment). The mobility service server 110 may receive the indication or request and may initiate the requested transaction.

An example process flow, such as those described in FIG. 1, may include receiving, at a user device 105 from a user, information to request a route at a first operation 140. For example, a user may provide a start location (e.g., address), an end location, user preference, and/or transportation mode constraints. At operation 145, the user device 105 may generate and transmit a request for a route to a mobility services server 110. In some embodiments, the user device 105 may provide authentication credentials or a user account identifier in the request.

At operation 150, the mobility service server 110 may identify a user account associated with the request. The mobility service server 110 may receive the request and may parse the request to obtain information. At operation 155, the mobility service server 110 may obtain preferences associated with the user account and data from different sources. At operation 160, the mobility service server 110 may determine one or more suggested routes. The suggested routes may include route segments that may be of different transportation modes. Data associated with the different route segments (e.g., cost, duration, departure time, etc.) may be aggregated into a list. The mobility service server 110 may transmit the one or more suggested routes and transportation options for the route segments (e.g., list) to the user device 105. At operation 165, the user device 105 may present the suggested routes to the user.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
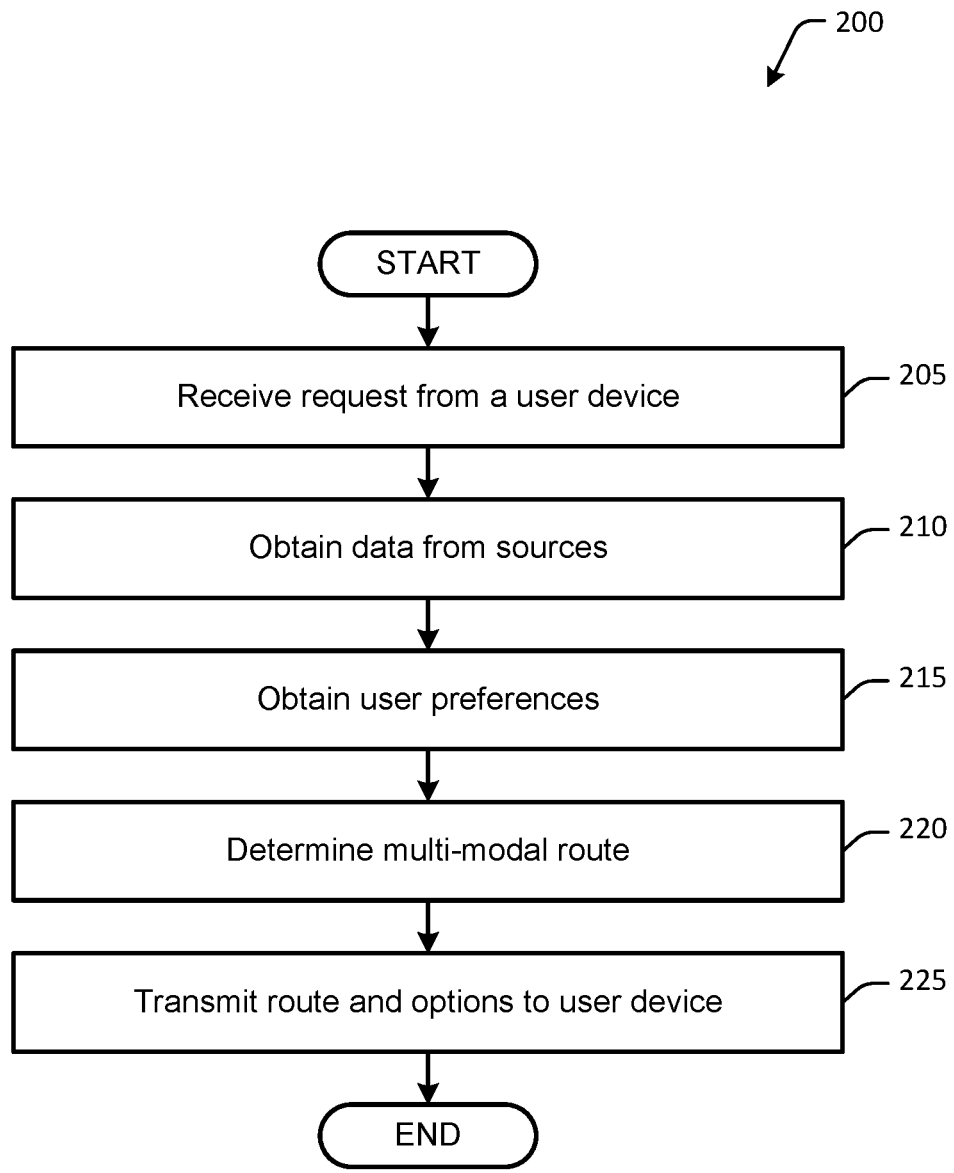
FIG. 2 is an example process flow diagram for a dynamic multi-modal mobility service platform in accordance with one or more embodiments of the disclosure.

Referring to FIG. 2, an example process flow diagram 200 for a dynamic multi-modal mobility service platform in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2. At block 205, a mobility service server 110 may receive a request from a user device 105.

At block 210, the mobility service server 110 may obtain data from one or more source servers 120. In some embodiments, the mobility service server 110 may identify a geographic region associated with the request. The mobility service server 110 may determine one or more source servers 120 associated with one or more modes of transportation in the geographic region and may obtain data for route segments for specific dates and/or times. The mobility service server 110 may aggregate the obtained data.

At block 215, the mobility service server 110 may obtain preferences and/or user route history data from one or more profile servers 130. In some embodiments, the preferences and/or user route history data may be obtained from the one or more profile servers 130 based on a user account identifier and/or authentication credentials provided by the user.

At block 220, the mobility service server 110 may determine a multi-modal route. In some embodiments, the mobility service server 110 may apply machine learning techniques to generate one or more suggested routes based on the information from the request, the data obtained from the one or more source servers 120, and/or the preferences and/or route history data from the one or more profile servers 130. In some embodiments, based on the route, the mobility service server 110 may adjust the list to include different modes of transportation and associated information (e.g., cost, time of departure, duration, etc.) based on the route.

At block 225, the mobility service server 110 may transmit the route and options in the adjusted list to the user device 105 for presentation to the user.

Figure 3A:
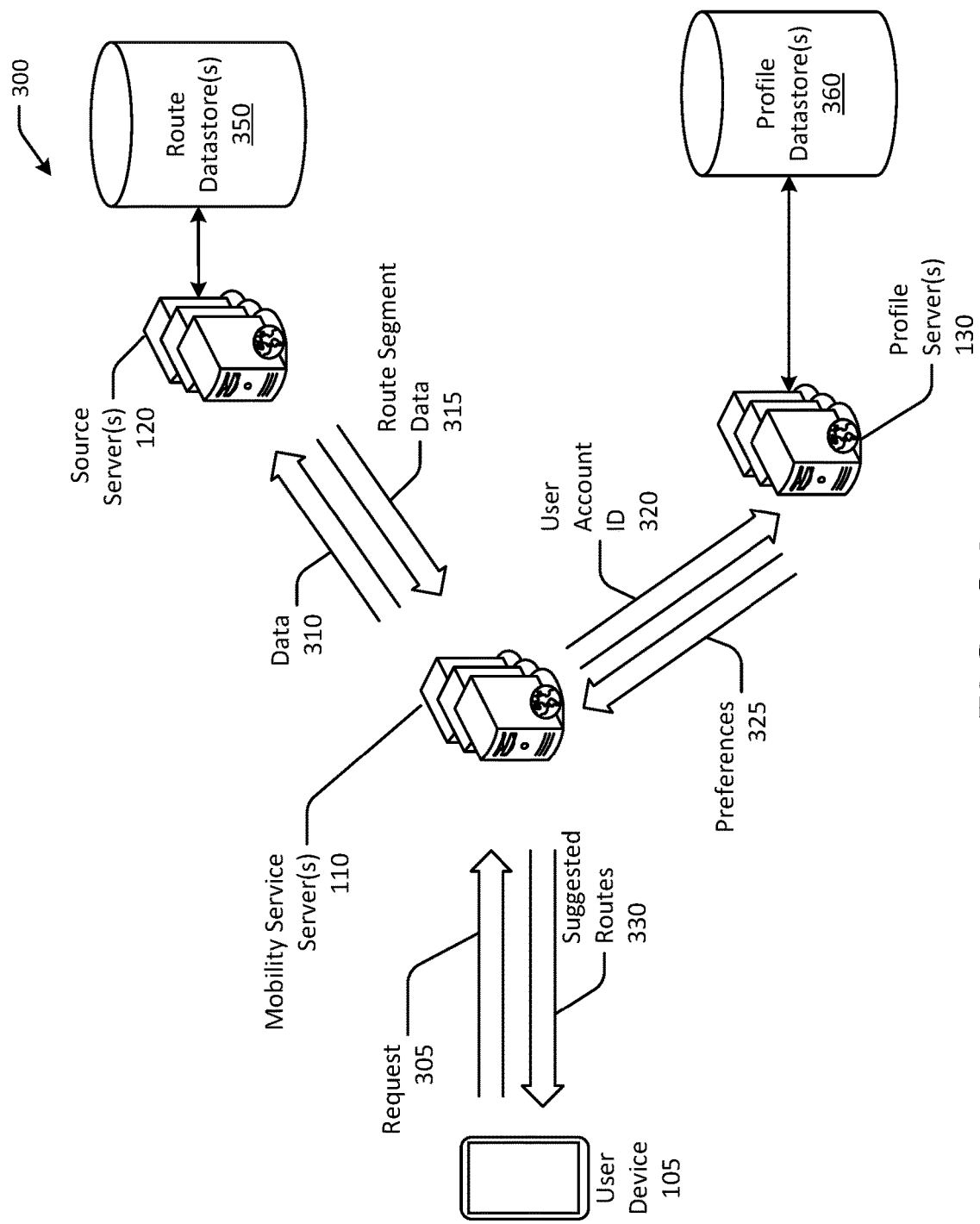
FIG. 3A is a schematic hybrid system/data flow diagram depicting various illustrative data communications between components of the system architecture depicted in FIG. 1 as part of a process for a dynamic multi-modal mobility service platform in accordance with one or more example embodiments of the disclosure.

Now referring to FIG. 3A, a schematic hybrid system/data flow diagram 300 depicts various illustrative data communications between components of the system architecture depicted in FIG. 1 as part of a process for a dynamic multi-modal mobility service platform in accordance with one or more example embodiments of the disclosure.

A user device 105 may have a web browser or a dedicated mobile application 305 for requesting a route between identified locations. In some embodiments, the user may specify two or more locations, date, time, preferences, and/or transportation mode constraints. In some embodiments, the user may share their arrival time or actual location of travel with other people for specific period of time or indefinite period of time. In some embodiments, the users that receive the shared arrival time or actual location of travel may use the information to plan their trips accordingly.

The web browser or dedicated mobile application may generate a request 305 and transmit the request 305 to the mobility services server 110. The mobility services server 110 may parse the request 305 and may identify a user account identifier as well as information specified by the user. The mobility services server 110 may identify a geographic region based on the two or more identified locations. The mobility service server 110 may identify one or more source servers 120 based on the geographic region and may transmit data 310 to the one or more source servers 120. Examples of data 310 transmitted to the one or more source servers 120 may include date, time, geographic regions, and the like.

The one or more source servers 120 may transmit route segment data 315 to the mobility services server 110. In some embodiments, the source server 120 may obtain the route segment data 315 from one or more route datastores 350. In some embodiments, the route segment data 315 may include, but is not limited to, identification of the type of transportation, departure and arrival locations for the route segment, schedules for the transportation, cost of the ticket and/or reservation for the mode of transportation, and the like. In some embodiments, the system may automatically detect the traversal of toll roads and prompt user about real-time toll charges. In some embodiments, the user may receive a summary of toll roads and have the toll information and charges in the receipt or invoice. The mobility services server 110 may aggregate the route segment data 315 from the one or more source servers 120. The mobility services server 110 may communicate with one or more profile servers 130. In some embodiments, the mobility services server 110 may use the user account identifier 320, authentication credentials, or other identifying information to request user preferences 325 and/or user route history information. The user preferences 325 may include any number of preferences for types of transportation (e.g., likes trains, does not like taxis, etc.), preferences in route types (e.g., prefers highways, etc.), constraints for modes of transportation (e.g., needs wheelchair access, etc.), ordering of options (e.g., cost, time of travel, comfort, etc.) or the like. The profile servers 130 may retrieve the preferences 325 from one or more profile datastores 360. The one or more profile servers 130 may transmit the requested information (e.g., user preferences 325) to the mobility service server 110.

The mobility services server 110 may use machine learning techniques to identify one or more optimized suggested routes 330 that include multiple modes of transportation. The one or more optimized suggested routes 330 may be generated based on information from the request 305, route segment data 315 from the source servers 120, and/or user preferences 325, historic route data, and other information obtained from the profile servers 130. In some embodiments, the mobility service servers 110 may adjust the list of aggregated route segment data 315 based on the suggested routes 330 and may transmit the suggested routes 330 and adjusted list to the user device 105 for presentation.

Figure 3B:
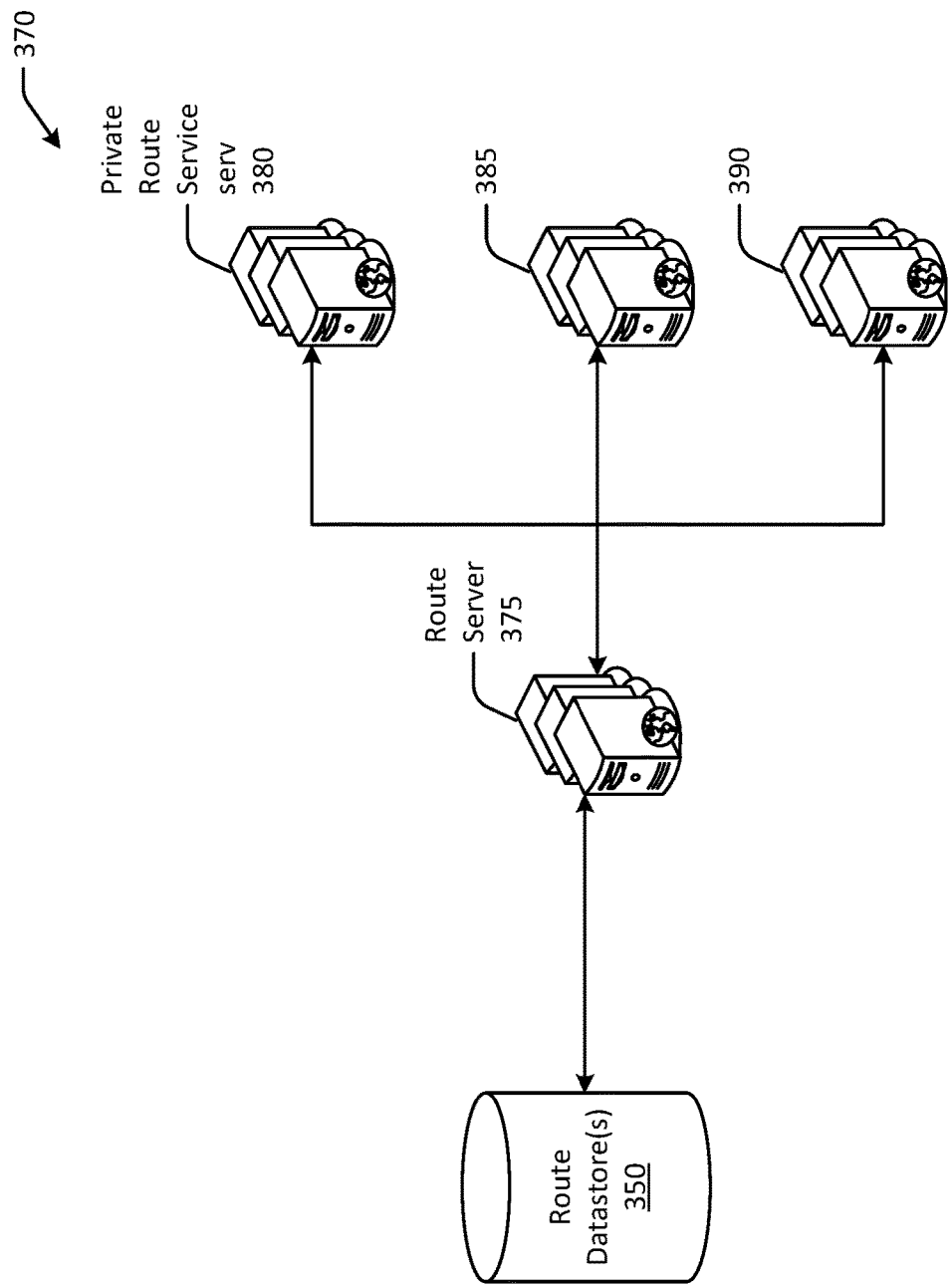
FIG. 3B is a schematic hybrid system/data flow diagram depicting various illustrative data communications between components of the system architecture depicted in FIG. 1 as part of a process for populating the route datastore for a dynamic multi-modal mobility service platform in accordance with one or more example embodiments of the disclosure.

FIG. 3B is a schematic hybrid system/data flow diagram 370 depicting various illustrative data communications between components of the system architecture depicted in FIG. 1 as part of a process for populating the route datastore for a dynamic multi-modal mobility service platform in accordance with one or more example embodiments of the disclosure. In some embodiments, the route datastore 350 may be in communication with one or more route system servers 375. The route system servers 375 may be in communication with one or more of a private route service server 380, a public bus transit service server 385, and/or a public train transit service server 390. The private route service server 380 may provide schedules and availability information for private transportation such as taxis, rideshares, autonomous vehicle rides, car rentals, limousine service, or the like. The private route service server 385 may enable or facilitate scheduling, reserving, canceling, or otherwise managing the private routes. The public bus transit service server 385 may provide schedules for different bus routes, fare information, ability to reserve or buy tickets, or the like. The public bus transit service server 385 may also provide notifications regarding delays or interruptions to service. The public train transit service server 390 may provide schedules for different train routes, fare information, ability to reserve or buy tickets, or the like. The public train transit service server 390 may also provide notifications regarding delays or interruptions to service.

Figure 4:
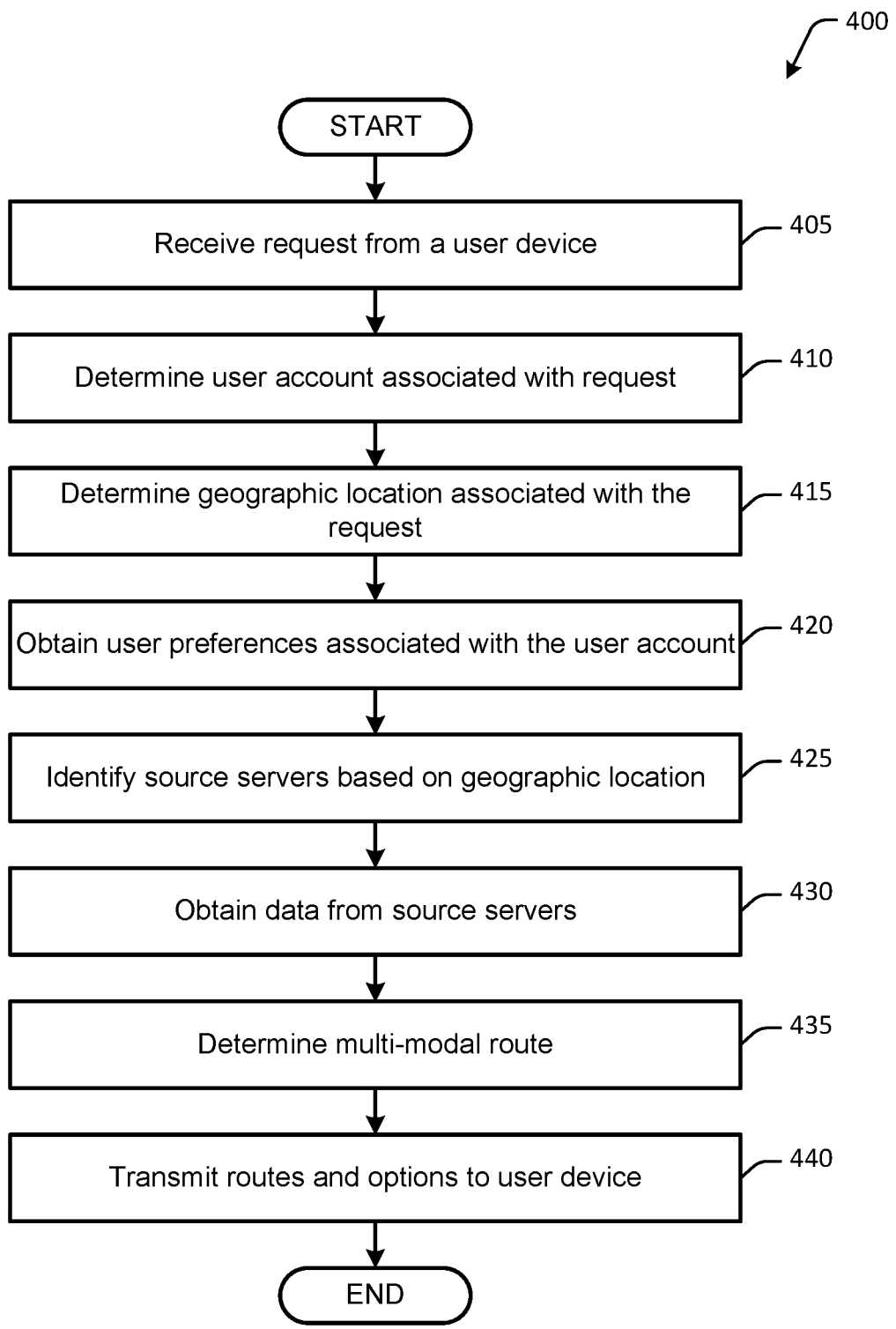
FIG. 4 is an example process flow diagram for a dynamic multi-modal mobility service platform in accordance with one or more embodiments of the disclosure.

Now referring to FIG. 4, depicted is an example diagram of a data flow 400 for a dynamic multi-modal mobility service platform in accordance with one or more embodiments of the disclosure. At block 405, the mobility services server 110 may receive a request from a user device 105. The request 305 may be received from a web browser or a dedicated client application executing on a user device 105. The request may indicate a start location, end location, date of trip, time of trip, one or more preferences, and/or transportation mode constraints. In some embodiments, the request may include a user account identifier.

At block 410, the mobility services server 110 may determine a user account associated with the request 305. In some embodiments, the mobility services server 110 may parse the request and identify a user account identifier. In some embodiments, the mobility services server 110 may identify a user account associated with the user device 105 based at least in part on a device identifier or session identifier.

At block 415, the mobility services server 110 may determine a geographic location associated with the request 305. In some embodiments, the mobility services server 110 may calculate a center point between the start and end locations. The mobility service server 110 may identify a distance radius inclusive of the start and end locations and may determine a geographic location based on the distance radius. In some embodiments, the mobility service server 110 may calculate the path between the start location and the end location in a conventional system or as a linear geometric path and may determine the geographic location based at least in part on the path. In some embodiments, the mobility services server 110 may determine the geographic path based on a predetermined distance from the start location and/or the end location.

At block 420, the mobility services server 110 may obtain user preferences associated with the user account. In some embodiments, the mobility services server 110 may request user preferences and/or historic route data associated with the user account. One or more profile servers 130 may receive the request and may transmit the route segment data to the mobility services server 110.

At block 425, the mobility services server 110 may identify one or more source servers 120 based on the geographic location. In some embodiments, the mobility services server 110 may determine the one or more servers 120 are associated with modes of transportation within the geographic location.

At block 430, the mobility services server 110 may obtain data from the one or more source servers 120. The mobility services server 110 may generate and transmit a request for route segments based on data obtained from the request.

At block 435, the mobility services server 110 may determine one or more suggested multi-modal routes. In some embodiments, the mobility service server 110 may utilize machine learning techniques to identify options for different modes of transportation for the given start area and end area based on training data input into the model learning model. For example, the mobility services server 110 may query services identified as potential transport providers. Agents for each of the potential transport providers may provide a segment of transport based on the start and end location, its cost, start times, duration of the segment, or the like. In some embodiments, options for segment calculation may use adaptable machine learning algorithms including logistic regression, clustering algorithm, principal component analysis, and the like.

In some embodiments, the mobility service server 110 may obtain and aggregate the different route segment options. In some embodiments, the mobility service server 110 may use a distance matrix to verify and confirm that the constraints provided by the user or associated with the user have been satisfied. The different route segment options may be transmitted to the requesting user device for presentation to the user. At block 440, the mobility services server 110 may transmit the one or more suggested routes and options to the user device 105.

In some embodiments, the mobility services server 110 may receive an indication or a request from the user device 105 to request or reserve a route segment. For instance, the user device 105 may have rendered a button or a hyperlink to request purchase of a ticket or reservation of a mode of transportation. In some embodiments, the mobility services server 110 may receive the indication or request and may initiate the reservation or purchase. In some embodiments, the mobility services server 110 may retrieve payment information (e.g., credit or debit card information, bank or payment account information, online payment system, or the like, associated with the user account and may initiate a transaction for the route segment using the payment information. In some embodiments, the mobility services server 110 may receive payment information with the indication or request from the user device 105. The mobile services server 110 may send a confirmation of the transaction once complete. If the transaction was denied (e.g., payment information invalid, ticket no longer available, vehicle no longer available, etc.), the mobile services server 110 may transmit a notification of the denial of the transaction. In some embodiments, the mobility services server 110 may suggest an alternate route segment and corresponding transaction based on the denial. In some embodiments, the transaction may not be able to be completed because additional information is required (e.g., copy of driver's license, insurance information, etc.). The mobility services server 110 may generate and transmit a message requesting additional information from the client device 105. The mobility services server 110 may complete the transaction using information received from the user device 105 in response to the message.

One or more operations of the methods, process flows, or use cases of FIGS. 1-4 may have been described above as being performed by a user device, or more specifically, by one or more program module(s), applications, or the like executing on a device. It should be appreciated, however, that any of the operations of the methods, process flows, or use cases of FIGS. 1-4 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-4 may be described in the context of the illustrative devices, it should be appreciated that such operations may be implemented in connection with numerous other device configurations.

The operations described and depicted in the illustrative methods, process flows, and use cases of FIGS. 1-4 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 5:
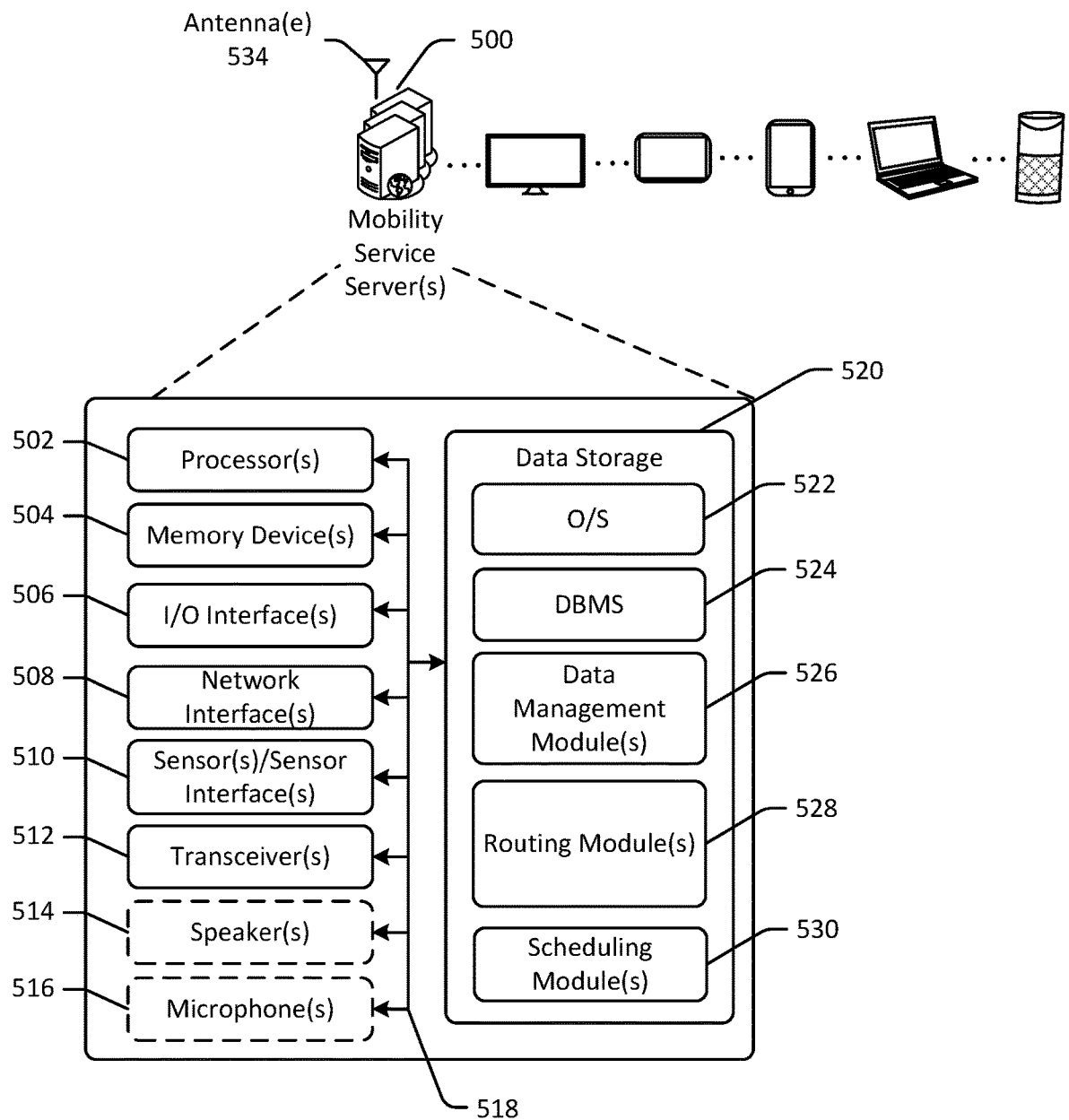
FIG. 5 schematically illustrates an example architecture of a mobility service server in accordance with one or more embodiments of the disclosure.

FIG. 5 is a schematic block diagram of one or more illustrative mobility service server(s) 500 in accordance with one or more example embodiments of the disclosure. The mobility service server(s) 500 may include any suitable computing device including, but not limited to, a server system, a mobile device such as a smartphone, a tablet, an e-reader, a wearable device, or the like; a desktop computer; a laptop computer; a content streaming device; a set-top box; or the like. The mobility service server(s) 500 may correspond to an illustrative device configuration for the mobility service servers of FIGS. 1-4.

The mobility service server(s) 500 may be configured to communicate via one or more networks with one or more servers, user devices, or the like. The mobility service server(s) 500 may be configured to receive requests for routing between identified locations, obtain routing segment data, obtain user preference data, generate multi-modal routes that include different suggested segments, and transmitted the routes to the requesting user device.

The mobility service server(s) 500 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the mobility service server(s) 500 may include one or more processors (processor(s)) 502, one or more memory devices 504 (generically referred to herein as memory 504), one or more input/output (I/O) interfaces 506, one or more network interfaces 508, one or more sensors or sensor interfaces 510, one or more transceivers 512, one or more optional speakers 514, one or more optional microphones 516, and data storage 520. The mobility service server(s) 500 may further include one or more buses 518 that functionally couple various components of the mobility service server(s) 500. The mobility service server(s) 500 may further include one or more antenna(e) 534 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Globalnaya Navigazionnaya Sputnikovaya Sistema (GLONASS) antenna for receiving GLONASS signals from a GLONASS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 518 may include at least one of a system bus, a memory bus, an address bus, or a message bus, and may permit exchange of information (e.g., data (including computer-executable code), signaling, etc.) between various components of the mobility service server(s) 500. The bus(es) 518 may include, without limitation, a memory bus or a memory controller, a peripheral bus, an accelerated graphics port, and so forth. The bus(es) 518 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 504 of the mobility service server(s) 500 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 504 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 504 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 520 may include removable storage and/or non-removable storage including, but not limited to, magnetic storage, optical disk storage, and/or tape storage. The data storage 520 may provide non-volatile storage of computer-executable instructions and other data. The memory 504 and the data storage 520, removable and/or non-removable, are examples of computer-readable storage media (CRSM) as that term is used herein.

The data storage 520 may store computer-executable code, instructions, or the like that may be loadable into the memory 504 and executable by the processor(s) 502 to cause the processor(s) 502 to perform or initiate various operations. The data storage 520 may additionally store data that may be copied to the memory 504 for use by the processor(s) 502 during the execution of the computer-executable instructions. Moreover, output data generated as a result of execution of the computer-executable instructions by the processor(s) 502 may be stored initially in the memory 504, and may ultimately be copied to the data storage 520 for non-volatile storage.

More specifically, the data storage 520 may store one or more operating systems (O/S) 522; one or more database management systems (DBMS) 524; and one or more program module(s), applications, engines, computer-executable code, scripts, or the like such as, for example, one or more data management module(s) 526, one or more routing module(s) 528, and/or one or more scheduling module(s) 530. Some or all of these module(s) may be sub-module(s). Any of the components depicted as being stored in the data storage 520 may include any combination of software, firmware, and/or hardware. The software and/or firmware may include computer-executable code, instructions, or the like that may be loaded into the memory 504 for execution by one or more of the processor(s) 502. Any of the components depicted as being stored in the data storage 520 may support functionality described in reference to corresponding components named earlier in this disclosure.

The data storage 520 may further store various types of data utilized by components of the mobility service server(s) 500. Any data stored in the data storage 520 may be loaded into the memory 504 for use by the processor(s) 502 in executing computer-executable code. In addition, any data depicted as being stored in the data storage 520 may potentially be stored in one or more datastore(s) and may be accessed via the DBMS 524 and loaded in the memory 504 for use by the processor(s) 502 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 5, an example datastore(s) may include, for example, web content, advertisement campaigns, advertisements, content items, and/or other information.

The processor(s) 502 may be configured to access the memory 504 and execute computer-executable instructions loaded therein. For example, the processor(s) 502 may be configured to execute computer-executable instructions of the various program module(s), applications, engines, or the like of the mobility service server(s) 500 to cause or facilitate various operations to be performed in accordance with one or more embodiments of the disclosure. The processor(s) 502 may include any suitable processing unit capable of accepting data as input, processing the input data in accordance with stored computer-executable instructions, and generating output data. The processor(s) 502 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 502 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 502 may be capable of supporting any of a variety of instruction sets.

Referring now to functionality supported by the various program module(s) depicted in FIG. 5, the data management module(s) 526 may include computer-executable instructions, code, or the like that responsive to execution by one or more of the processor(s) 502 may perform functions including, but not limited to, receiving one or more requests from one or more user devices 105, obtaining data from the requests, and transmitting the data to, for example, the routing module 528. The data management module 526 may receive one or more routes and/or route segments and associated information and may send the received data to the one or more user devices 105. Additionally, if the user device sends an indication to schedule a ride or buy a ticket, the indication may be transmitted to the scheduling module 530. The data management module may receive confirmation, denial, or request for additional information to the data management module 526, which may communicate the information to the one or more user devices 105.

The routing module(s) 528 may include computer-executable instructions, code, or the like that responsive to execution by one or more of the processor(s) 502 may perform functions including, but not limited to, receiving information from the data management module 526. The routing module may identify and communicate with one or more source servers 130 to identify routing segments and associated information for a requested route. The routing module 528 may communicate with one or more profile servers 130 to obtain user preferences or route history information associated with a user account. The routing module 528 may identify one or more suggested paths between identified locations using the information from the source servers 120, preferences from the profile servers 130, and/or the request from the user device 105 and may communicate the paths and associated data to the data management module 526 to transmit to the requesting user device 105.

The scheduling module(s) 530 may include computer-executable instructions, code, or the like that responsive to execution by one or more of the processor(s) 502 may perform functions including, but not limited to, receiving an indication from the data management module 536 for a user device 105 to schedule a rideshare, reserve a vehicle, procure a ticket, ride on a specific mode of transportation, or the like. The scheduling module 530 may complete the action and send a confirmation, receive a denial and transmit the denial to the data management module 526, or may request additional information needed to complete the transaction.

Referring now to other illustrative components depicted as being stored in the data storage 520, the O/S 522 may be loaded from the data storage 520 into the memory 504 and may provide an interface between other application software executing on the mobility service server(s) 500 and the hardware resources of the mobility service server(s) 500. More specifically, the O/S 522 may include a set of computer-executable instructions for managing hardware resources of the mobility service server(s) 500 and for providing common services to other application programs (e.g., managing memory allocation among various application programs). In certain example embodiments, the O/S 522 may control execution of the other program module(s) to dynamically enhance characters for content rendering. The O/S 522 may include any operating system now known or which may be developed in the future including, but not limited to, any server operating system, any mainframe operating system, or any other proprietary or non-proprietary operating system.

The DBMS 524 may be loaded into the memory 504 and may support functionality for accessing, retrieving, storing, and/or manipulating data stored in the memory 504 and/or data stored in the data storage 520. The DBMS 524 may use any of a variety of database models (e.g., relational model, object model, etc.) and may support any of a variety of query languages. The DBMS 524 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the mobility service server(s) 500 is a mobile device, the DBMS 524 may be any suitable lightweight DBMS optimized for performance on a mobile device.

Referring now to other illustrative components of the mobility service server(s) 500, the input/output (I/O) interface(s) 506 may facilitate the receipt of input information by the mobility service server(s) 500 from one or more I/O devices as well as the output of information from the mobility service server(s) 500 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the mobility service server(s) 500 or may be separate. The I/O devices may further include, for example, any number of peripheral devices such as data storage devices, printing devices, and so forth.

The I/O interface(s) 506 may also include an interface for an external peripheral device connection such as universal serial bus (USB), FireWire, Thunderbolt, Ethernet port or other connection protocol that may connect to one or more networks. The I/O interface(s) 506 may also include a connection to one or more of the antenna(e) 534 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The mobility service server(s) 500 may further include one or more network interface(s) 508 via which the mobility service server(s) 500 may communicate with any of a variety of other systems, platforms, networks, devices, and so forth. The network interface(s) 508 may enable communication, for example, with one or more wireless routers, one or more host servers, one or more web servers, and the like via one or more networks.

The antenna(e) 534 may include any suitable type of antenna depending, for example, on the communications protocols used to transmit or receive signals via the antenna (e) 534. Non-limiting examples of suitable antennae may include directional antennae, non-directional antennae, dipole antennae, folded dipole antennae, patch antennae, multiple-input multiple-output (MIMO) antennae, or the like. The antenna(e) 534 may be communicatively coupled to one or more transceivers 512 or radio components to which or from which signals may be transmitted or received.

As previously described, the antenna(e) 534 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 534 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 534 may be configured to transmit or receive radio frequency signals within any suitable frequency range forming part of the unlicensed portion of the radio spectrum.

The antenna(e) 534 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 512 may include any suitable radio component(s) for—in cooperation with the antenna(e) 534—transmitting or receiving radio frequency (RF) signals in the bandwidth and/or channels corresponding to the communications protocols utilized by the mobility service server(s) 500 to communicate with other devices. The transceiver(s) 512 may include hardware, software, and/or firmware for modulating, transmitting, or receiving—potentially in cooperation with any of antenna(e) 534—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 512 may further include hardware, firmware, or software for receiving GNSS signals. The transceiver(s) 512 may include any known receiver and baseband suitable for communicating via the communications protocols utilized by the mobility service server(s) 500. The transceiver(s) 512 may further include a low noise amplifier (LNA), additional signal amplifiers, an analog-to-digital (A/D) converter, one or more buffers, a digital baseband, or the like.

The sensor(s)/sensor interface(s) 510 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 514 may be any device configured to generate audible sound. The microphone(s) 516 may be any device configured to receive analog sound input or voice data.

It should be appreciated that the program module(s), applications, computer-executable instructions, code, or the like depicted in FIG. 5 as being stored in the data storage 520 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the mobility service server(s) 500, and/or hosted on other computing device(s) accessible via one or more networks, may be provided to support functionality provided by the program module(s), applications, or computer-executable code depicted in FIG. 5 and/or additional or alternate functionality. Further, functionality may be modularized differently such that processing described as being supported collectively by the collection of program module(s) depicted in FIG. 5 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 5 may be implemented, at least partially, in hardware and/or firmware across any number of devices.

It should further be appreciated that the mobility service server(s) 500 may include alternate and/or additional hardware, software, or firmware components beyond those described or depicted without departing from the scope of the disclosure. More particularly, it should be appreciated that software, firmware, or hardware components depicted as forming part of the mobility service server(s) 500 are merely illustrative and that some components may not be present or additional components may be provided in various embodiments. While various illustrative program module(s) have been depicted and described as software module(s) stored in the data storage 520, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

We claim:

1. A method comprising:
   receiving a request for a route, wherein said request comprises a start location and an end location;
   determining a source based at least in part on said request;
   obtaining route segments from said source;
   generating a suggested route based at least in part on said start location, said end location, and said route segments, said suggested route comprising a plurality of said route segments, at least one of said route segments being associated with a different mode of transportation than another of said route segments;
   transmitting said suggested route in response to said request;
   receiving a second request, said second request being a request to purchase a right of access to a mode of transportation associated with one of said plurality of said route segments; and
   initiating a purchase transaction with an entity associated with said mode of transportation for said right of access to said mode of transportation associated with said one of said plurality of said route segments.

2. The method of claim 1, further comprising:
   determining a user account identifier based at least in part on said request; and
   obtaining user preferences associated with said user account identifier; and wherein
   said step of generating a suggested route includes generating said suggested route based at least in part on said user preferences.

3. The method of claim 2, wherein said user preferences identify a particular accommodation required on at least one of said route segments.

4. The method of claim 2, wherein said user preferences identify a particular route parameter to be optimized in said suggested route.

5. The method of claim 1, wherein:
   said step of receiving a request for a route includes receiving user preferences with said request; and
   said step of generating a suggested route includes generating said suggested route based at least in part on said user preferences.

6. The method of claim 5, wherein said user preferences identify a particular accommodation required on at least one of said route segments.

7. The method of claim 5, wherein said user preferences identify a particular route parameter to be optimized in said suggested route.

8. The method of claim 1, further comprising:
   generating a list including data associated with said plurality of said route segments; and
   transmitting said list in response to said request.

9. The method of claim 1, wherein available modes of transportation for certain route segments include autonomous vehicles.

10. A system comprising:
    one or more computer processors; and
    one or more memories comprising computer-executable instructions operable to cause said system to:
      receive a request for a route, wherein said request comprises a start location and an end location;
      determine a source based at least in part on said request;
      obtain route segments from said source;
      generate a suggested route based at least in part on said start location, said end location, and said route segments, said suggested route comprising a plurality of said route segments, at least one of said route segments being associated with a different mode of transportation than another of said route segments;
      transmit said suggested route in response to said request;
      receive a second request, said second request being a request to purchase a right of access to a mode of transportation associated with one of said plurality of said route segments; and
      initiating a purchase transaction with an entity associated with said mode of transportation for said right of access to said mode of transportation associated with said one of said plurality of said route segments.

11. The system of claim 1, wherein said computer-executable instructions are further operable to cause said system to:
    determine a user account identifier based at least in part on said request;
    obtain user preferences associated with said user account identifier; and
    generate said suggested route based at least in part on said user preferences.

12. The system of claim 11, wherein said user preferences identify a particular accommodation required on at least one of said route segments.

13. The system of claim 11, wherein said user preferences identify a particular route parameter to be optimized in said suggested route.

14. The system of claim 10, wherein:
    said request for a route includes user preferences; and
    said computer-executable instruction are further operable to cause said system to generate said suggested route by generating said suggested route based at least in part on said user preferences.

15. The system of claim 14, wherein said user preferences identify a particular accommodation required on at least one of said route segments.

16. The system of claim 14, wherein said user preferences identify a particular route parameter to be optimized in said suggested route.

17. The system of claim 10, wherein said computer-executable instructions are further operable to cause said system to:
generate a list including data associated with said plurality of said route segments; and
transmit said list in response to said request.

18. The method of claim 10, wherein available modes of transportation for certain route segments include autonomous vehicles.

19. A non-transitory computer-readable medium comprising instructions therein for causing a device to:
receive a request for a route, wherein said request comprises a start location and an end location;
determine a source based at least in part on said request;
obtain route segments from said source;
generate a suggested route based at least in part on said start location, said end location, and said route segments, said suggested route comprising a plurality of said route segments, at least one of said route segments being associated with a different mode of transportation than another of said route segments;
transmit said suggested route in response to said request;
receive a second request, said second request being a request to purchase a right of access to a mode of transportation associated with one of said plurality of said route segments; and
initiate a purchase transaction with an entity associated with said mode of transportation for said right of access to said mode of transportation associated with said one of said plurality of said route segments.

20. The method of claim 9, wherein said step of generating a suggested route includes generating said suggested route based at least in part on real-time autonomous vehicle availability.

21. The method of claim 18, wherein said computer-executable instructions are operable to cause said system to generate said suggested route based at least in part on real-time autonomous vehicle availability.

* * * * *